US009762323B2

(12) United States Patent
Shieh

(10) Patent No.: US 9,762,323 B2
(45) Date of Patent: Sep. 12, 2017

(54) METHOD AND APPARATUS FOR FIBER NON-LINEARITY MITIGATION

(75) Inventor: William Shieh, Victoria (AU)

(73) Assignee: Ofidium Pty. Ltd., Melbourne (AU)

( * ) Notice: Subject to any disclaimer, the term of this patent is extended or adjusted under 35 U.S.C. 154(b) by 170 days.

(21) Appl. No.: 13/635,815

(22) PCT Filed: Mar. 17, 2011

(86) PCT No.: PCT/AU2011/000293
§ 371 (c)(1),
(2), (4) Date: Dec. 3, 2012

(87) PCT Pub. No.: WO2011/113097
PCT Pub. Date: Sep. 22, 2011

(65) Prior Publication Data
US 2013/0195459 A1      Aug. 1, 2013

Related U.S. Application Data

(60) Provisional application No. 61/315,537, filed on Mar. 19, 2010.

(51) Int. Cl.
*H04B 10/50*      (2013.01)
*H04B 10/00*      (2013.01)
(Continued)

(52) U.S. Cl.
CPC ..... *H04B 10/2507* (2013.01); *H04B 10/2543* (2013.01); *H04L 27/2614* (2013.01); *Y02B 60/43* (2013.01)

(58) Field of Classification Search
CPC ............ H04B 10/2507; H04B 10/2543; H04L 27/2614; Y02B 60/43
(Continued)

(56) References Cited

U.S. PATENT DOCUMENTS 6,825,128 B2 * 11/2004 Masuda .................. 438/750
7,418,041 B2 * 8/2008 Jung et al. ............... 375/260
(Continued)

FOREIGN PATENT DOCUMENTS

| WO | WO 2009-049364 | 4/2009 |
| WO | WO 2009-152863 | 12/2009 |
| WO | WO 2011-113097 | 9/2011 |

OTHER PUBLICATIONS

Shieh et al, "Coherent optical OFDM has its time come", Mar. 2008, Journal of Optical Networking, vol. 7 Issue 3, pp. 234-255.*
(Continued)

*Primary Examiner* — Ken N Vanderpuye
*Assistant Examiner* — Dibson Sanchez
(74) *Attorney, Agent, or Firm* — Baker & Hostetler LLP

(57) ABSTRACT

A method (1200) of transmitting digital information via a nonlinear optical channel (722), comprises receiving (1202) data (702) comprising at least a portion of the digital information. A plurality of frequency domain symbols is generated (1204) from the data, and each symbol is assigned to one of a predetermined plural number of frequency sub-bands. Each sub-band may be processed separately (1206) to reduce a peak-to-average power ratio (PAPR) of a transmitted optical signal. The optical signal (12) is then generated (1208) comprising the plural number of sub-bands, and transmitted via the nonlinear optical channel (722). The plural number of frequency sub-bands is predetermined so as to reduce nonlinear optical distortion of the optical signal within the nonlinear optical channel relative to a corresponding single frequency band signal. A corresponding information-receiving method, a transmitter apparatus and a receiver apparatus are also disclosed.

17 Claims, 7 Drawing Sheets

(51) Int. Cl.
*H04B 10/07* (2013.01)
*H04B 10/2507* (2013.01)
*H04L 27/26* (2006.01)
*H04B 10/2543* (2013.01)

(58) Field of Classification Search
USPC ............. 398/79, 25–38, 140–172, 182–201
See application file for complete search history.

(56) References Cited

U.S. PATENT DOCUMENTS

| | | | |
|---|---|---|---|
| 7,486,735 B2 * | 2/2009 | Dubuc et al. .................. 375/260 |
| 7,496,028 B2 * | 2/2009 | Jung et al. .................... 370/208 |
| 7,693,429 B1 * | 4/2010 | Lowery .......................... 398/192 |
| 7,720,175 B2 | 5/2010 | Yeon et al. .................... 375/297 |
| 8,107,826 B2 * | 1/2012 | Armstrong et al. .......... 398/193 |
| 8,112,001 B2 * | 2/2012 | Lowery et al. ............... 398/158 |
| 8,204,377 B2 * | 6/2012 | Liu et al. ........................ 398/65 |
| 8,218,979 B2 * | 7/2012 | Liu .................... H04B 10/2513 398/202 |
| 8,233,799 B2 * | 7/2012 | Lowery ............................ 398/76 |
| 8,526,412 B2 * | 9/2013 | Vijayan et al. ............... 370/344 |
| 2004/0135315 A1 * | 7/2004 | Chabot et al. ................. 273/269 |
| 2004/0136315 A1 * | 7/2004 | Chang ............................ 370/206 |
| 2004/0162097 A1 * | 8/2004 | Vijayan ................ H04L 5/0007 455/522 |
| 2005/0105589 A1 * | 5/2005 | Sung et al. .................... 375/130 |
| 2005/0271387 A1 * | 12/2005 | Kee .................... H04B 10/2543 398/140 |
| 2006/0189321 A1 * | 8/2006 | Oh ........................ H04W 16/18 455/452.2 |
| 2006/0203932 A1 * | 9/2006 | Palanki .................... H04B 1/69 375/295 |
| 2006/0291470 A1 * | 12/2006 | Khandekar ........... H04L 5/0007 370/395.1 |
| 2007/0206559 A1 * | 9/2007 | Cho ...................... H04L 5/0094 370/344 |
| 2007/0211807 A1 * | 9/2007 | Han et al. ..................... 375/260 |
| 2007/0217525 A1 * | 9/2007 | Vrcelj et al. .................. 375/260 |
| 2008/0108390 A1 * | 5/2008 | Yoon et al. .................... 455/561 |
| 2008/0151831 A1 * | 6/2008 | Khan et al. ................... 370/330 |
| 2008/0212698 A1 * | 9/2008 | Kim et al. ..................... 375/260 |
| 2009/0169213 A1 * | 7/2009 | Lowery .............. H04B 10/2513 398/98 |
| 2009/0180778 A1 * | 7/2009 | Rhee .................... H04B 10/548 398/79 |
| 2009/0190929 A1 * | 7/2009 | Khurgin ................ H04B 10/61 398/79 |
| 2009/0257344 A1 * | 10/2009 | Huang et al. .................. 370/210 |
| 2009/0324226 A1 * | 12/2009 | Buchali et al. ................. 398/76 |
| 2010/0021163 A1 | 1/2010 | Shieh |
| 2010/0027994 A1 * | 2/2010 | Xu ....................... H04B 10/548 398/43 |
| 2010/0034542 A1 | 2/2010 | Armstrong |
| 2010/0091903 A1 * | 4/2010 | Castelain et al. ............. 375/295 |
| 2010/0104044 A1 * | 4/2010 | Kishigami .......... H04L 27/2628 375/299 |
| 2010/0178057 A1 | 7/2010 | Shieh |
| 2010/0215031 A1 * | 8/2010 | Kim et al. ..................... 370/344 |
| 2011/0135016 A1 * | 6/2011 | Ahn et al. ..................... 375/259 |
| 2012/0182948 A1 * | 7/2012 | Huang et al. .................. 370/329 |

OTHER PUBLICATIONS

Takayuki et al, "Over 100 Gbs Electro-Optically Multiplexed OFDM for High-Capacity Optical Transport Network ", Aug. 2009, Lightwave Technology, vol. 27 Issue 16, pp. 3714-3720.*

Yang et al , "107 Gbs Coherent Optical OFDM Reception Using Orthogonal Band Multiplexing", Feb. 2008, OFC/NFOEC, pp. 1-3.*

Shieh et al, Coherent optical OFDM theory and design, Jan. 2008, OSA, pp. 841-859.*

Goebel et al, On the Effect of FWM in Coherent Optical OFDM Systems, 2008, OSA, pp. 1-3.*

Krongold et al, Fiber nonlinearity mitigation by PAPR reduction in coherent optical OFDM systems via active constellation extension, Dec. 2008, IEEE, pages All Document.*

* cited by examiner

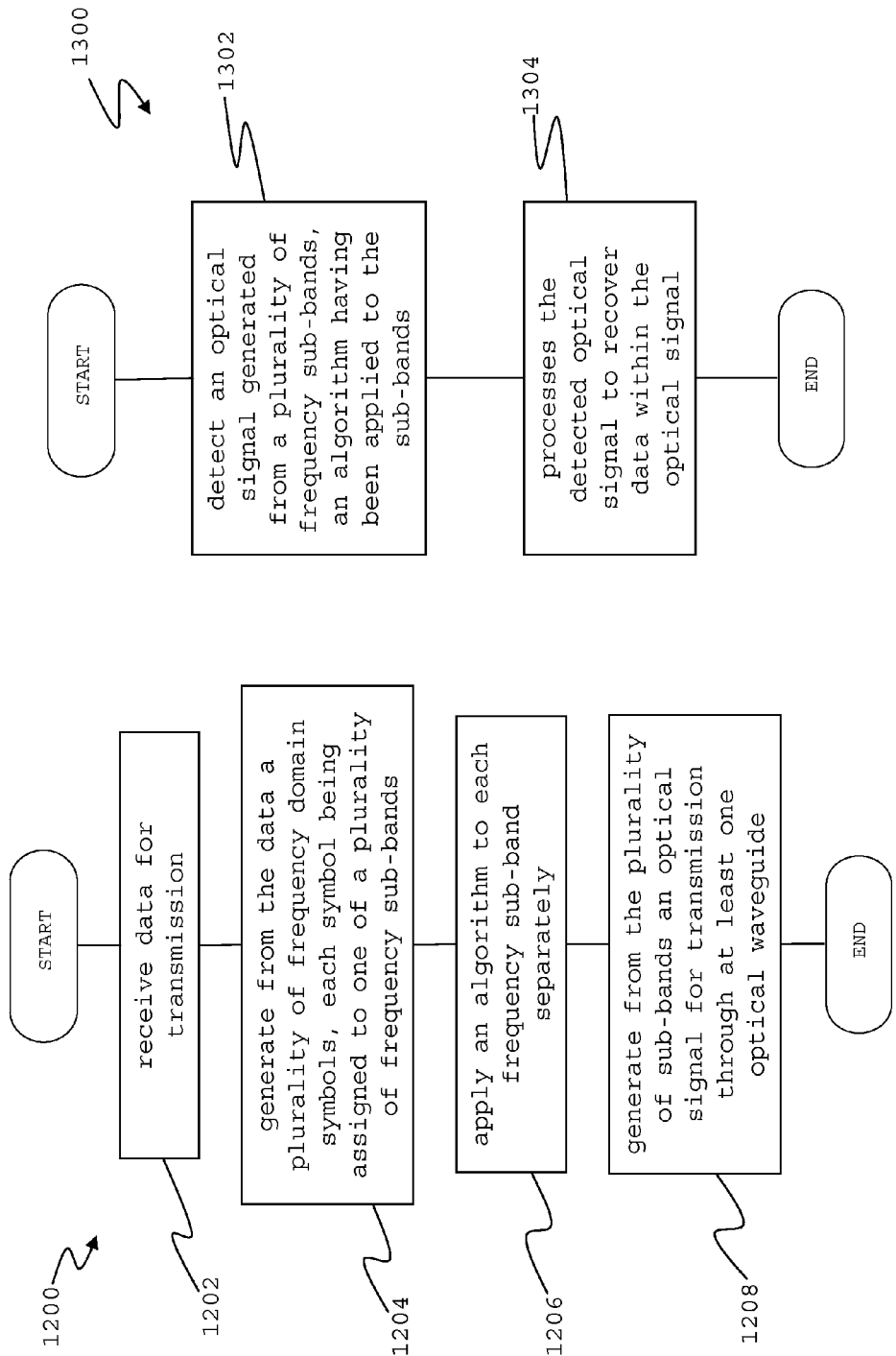

METHOD AND APPARATUS FOR FIBER NON-LINEARITY MITIGATION

CROSS-REFERENCE TO RELATED APPLICATIONS

This application is the National Stage of International Application No. PCT/AU2011/000293, filed Mar. 17, 2011, which claims the benefit of U.S. Provisional Application No. 61/315,537, filed Mar. 19, 2010, the disclosures of which are incorporated herein by reference in their entireties.

FIELD OF THE INVENTION

The present invention relates generally to optical telecommunications, more particularly to the generation and detection of optical signals having improved tolerance to nonlinear optical transmission effects.

BACKGROUND OF THE INVENTION

Coherent optical Orthogonal Frequency Division Multiplexing (CO-OFDM) has been demonstrated in fiber optic transmission, beyond 1 Tb/s per wavelength. Optical Fiber nonlinearity is a prominent obstacle to practical implementation of CO-OFDM. The conventional thinking is that OFDM has high peak-to-average power ratio (PAPR) and because nonlinear effects within fiber that cause signal distortion scale with optical power, CO-OFDM must suffer from greater signal distortion.

SUMMARY OF INVENTION

According to a first aspect of the invention, there is provided a method of transmitting digital information via a nonlinear optical channel, comprising the steps of: receiving data comprising at least a portion of the digital information; generating from the data a plurality of frequency domain symbols; assigning each symbol to one of a predetermined plural number of frequency sub-bands; generating an optical signal comprising the plural number of sub-bands; and transmitting the optical signal via said nonlinear optical channel, wherein the plural number of frequency sub-bands is predetermined so as to reduce nonlinear optical distortion of the optical signal within the nonlinear optical channel relative to a corresponding single frequency band signal.

The method may comprise the further step of processing the frequency domain symbols to reduce a peak-to-average power ratio (PAPR) of the transmitted optical signal. A PAPR reduction algorithm may be applied to each frequency sub-band separately. In various embodiments, the algorithm is selected from the group consisting of: a discrete Fourier transform spreading (DFT-s) algorithm; a selective mapping algorithm; and an active constellation extension algorithm.

Predetermining the plural number of the sub-bands may comprise computing the number of sub-bands, for example either by calculation from theoretical principles, of by computer simulation.

Alternatively, predetermining the plural number of the sub-bands may comprise: transmitting a plurality of training signals via the nonlinear optical channel, each training signal comprising predetermined data value and having a different number of sub-bands; detecting each training signal after transmission via the nonlinear optical channel; processing each detected signal to recover received data; determining a bit-error rate of each detected training signal by comparing received data values with the predetermined data values of the training signal; and determining the predetermined plural number of sub-bands using the determined bit-error rates.

In an embodiment, each sub-band has a single carrier. The single carrier of each respective sub-band may be spectrally bound within the respective sub-band.

In an embodiment, the optical signal may be an optical orthogonal frequency division multiplexed (O-OFDM) signal.

According to another aspect of the invention, there is provided a method of receiving digital information transmitted in an optical signal via a nonlinear optical channel, the optical signal comprising a predetermined plural number of sub-bands, each sub-band having assigned thereto a plurality of frequency domain symbols generated from data comprising at least a portion of the digital information, the method comprising the steps of: detecting the optical signal; processing the detected optical signal to recover the frequency domain symbols assigned to each one of said predetermined plural number of frequency sub-bands; and processing the frequency domain symbols to recover received data, wherein the plural number of frequency sub-bands is predetermined so as to reduce nonlinear optical distortion of the optical signal within the nonlinear optical channel relative to a corresponding single frequency band signal.

In some embodiments, the frequency domain symbols have been processed prior to transmission via the nonlinear optical channel using an algorithm adapted to reduce a peak-to-average power ratio (PAPR) of the transmitted optical signal, and the step of processing the frequency domain symbols to recover received data comprises applying an inverse algorithm adapted to reverse the effect of the algorithm adapted to reduce the PAPR of the transmitted optical signal.

The inverse algorithm may be selected from the group consisting of: an inverse discrete Fourier transform spreading (IDFT-s) algorithm an inverse selective mapping algorithm; and an inverse active constellation extension algorithm.

In an embodiment, each sub-band has a single carrier. The single carrier of each respective sub-band may be spectrally bound within the respective sub-band.

In an embodiment, the optical signal is an optical orthogonal frequency division multiplexed (O-OFDM) signal.

According to a further aspect of the invention, there is provided an apparatus for transmitting digital information via a nonlinear optical channel, the apparatus being provided in use with input data comprising at least a portion of the digital information, the apparatus comprising: a frequency domain symbol generator configured to generate from the input data a plurality of frequency domain symbols, and to assign each symbol to one of a predetermined plural number of frequency sub-bands; a time-domain signal generator operatively coupled to the frequency domain symbol generator, and configured to generate a time-varying signal comprising the plural number of sub-bands; and an optical source having at least one modulation input operatively coupled to the time-domain signal generator, and configured to modulate an optical carrier with the time-varying signal to generate a corresponding optical signal comprising the plural number of sub-bands, wherein the plural number of frequency sub-bands is predetermined so as to reduce nonlinear optical distortion of the optical signal within the nonlinear optical channel relative to a corresponding single frequency band signal.

The apparatus may further comprise a peak-to-average power ratio (PAPR) reducing unit operatively coupled to the frequency domain symbol generator, and configured to processing the frequency domain symbols to reduce a peak-to-average power ratio (PAPR) of the transmitted optical signal. The inverse algorithm can be selected from the group consisting of: an inverse discrete Fourier transform spreading (IDFT-s) algorithm an inverse selective mapping algorithm; and an inverse active constellation extension algorithm.

According to yet another aspect of the invention, there is provided an apparatus for receiving digital information transmitted in an optical signal via a nonlinear optical channel, the optical signal comprising a predetermined plural number of sub-bands, each sub-band having assigned thereto a plurality of frequency domain symbols generated from data comprising at least a portion of the digital information, the apparatus comprising: a detector configured to detect the optical signal; and a processor configured to process the detected optical signal to recover the frequency domain symbols assigned to each one of said predetermined plural number of frequency sub-bands, and to process the frequency domain symbols to recover received data, wherein the plural number of frequency sub-bands is predetermined so as to reduce nonlinear optical distortion of the optical signal within the nonlinear optical channel relative to a corresponding single frequency band signal.

The frequency domain symbols may be processed prior to transmission via the nonlinear optical channel using an algorithm adapted to reduce a peak-to-average power ratio (PAPR) of the transmitted optical signal, and the processor further configured to process the frequency domain symbols to recover received data by applying an inverse algorithm adapted to reverse the effect of the algorithm adapted to reduce the PAPR of the transmitted optical signal. The inverse algorithm can be selected from the group consisting of: an inverse discrete Fourier transform spreading (IDFT-s) algorithm an inverse selective mapping algorithm; and an inverse active constellation extension algorithm.

Further features, benefits and advantages of the invention will be apparent to those skilled in the art of optical communications from the following description of embodiments of the invention, which it will be understood are offered by way of example only, and should not be taken as limiting the scope of the invention as defined in any of the foregoing statements, or in the claims appended hereto.

BRIEF DESCRIPTION OF THE DRAWINGS

Embodiments are described with reference to the accompanying drawings in which:

FIGS. 12 and 13 each show a flow chart of a respective method embodying the invention.

DETAILED DESCRIPTION OF EMBODIMENTS OF THE INVENTION

Figure 1:
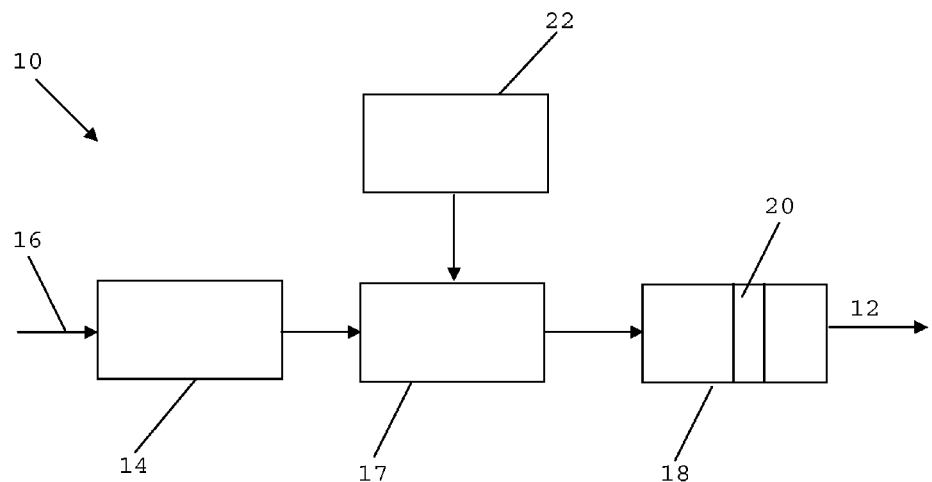
FIG. 1 is a block diagram of an optical transmitter according to an embodiment of the invention.
Figure 2:
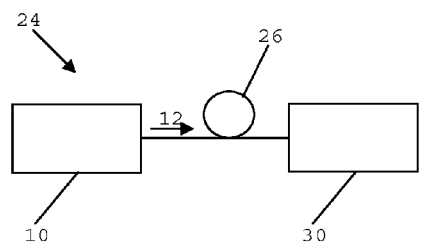
FIG. 2 is a schematic diagram of an embodiment of a transmission system comprising the transmitter of FIG. 1.

FIG. 1 is a block diagram of an optical transmitter 10 configured to transmit optical frequency division multiplexed signals, according to an exemplary embodiment of the invention. The transmitter may form part of a system 24, as shown in FIG. 2. The system 24 includes the transmitter 10 at one location, and a corresponding optical receiver 30 at a location remote to the transmitter 10. Transmitter 10 and receiver 30 are connected by an optical fiber link 26. The optical transmitter 10 generates an optical signal 12 having an improved tolerance to nonlinear optical distortion within the fiber link 26, relative to an optical signal from a conventional transmitter. Typically, the optical fiber link 26 is composed of a plurality of spans of optical fiber, and comprises optical amplifiers to compensate for transmission losses. The fiber link may also include dispersion compensating elements, such as lengths of dispersion compensating fiber (DCF) associated with one or more of the transmission spans.

The exemplary transmitter 10 has a data receiver 14 configured to receive data 16 in the form of digital bits for transmission through the optical link 26.

The transmitter 10 comprises a frequency domain symbol generator 17 in communication with the data receiver 14 and configured to generate from the data 16 a plurality of frequency domain symbols. Each symbol is assigned to one of a plurality of frequency sub-bands by the frequency domain signal generator 17.

The transmitter further comprises an optical signal generator 18 in communication with the frequency domain symbol generator 17 and configured to generate from the plurality of sub-bands an optical signal for transmission. The optical signal generator 18 processes the frequency domain symbols such that the peak-to-average power ratio (PAPR) of the optical signal 12 is reduced. Because nonlinear distortion scales with the PAPR, reducing the PAPR reduces nonlinear distortion of the optical signal within the link 26.

In alternative arrangements, processing of the frequency domain symbols may occur in the frequency domain generator, or in an additional unit.

In one embodiment, the PAPR is reduced by applying a DFT-spreading algorithm to each frequency sub-band separately by DFT-spreading unit 20 located within the optical signal generator. In alternative embodiment, PAPR reduction may be achieved using a selective mapping algorithm, or an active constellation extension algorithm, or any other suitable algorithm known in the art of digital communications.

The reduction in nonlinear optical distortion achieved may generally be dependent on the number of sub-bands. In the transmitter 10, a sub-band determiner 22 in communication with the frequency domain symbol generator 17 determines the optimal number of sub-bands, for example when a new physical optical link having unknown optical properties, such as chromatic dispersion and nonlinearity, is configured. The sub-band determiner 22 sends sub-band quantity information to the frequency domain symbol generator which controls how many sub-bands the generator 17 produces.

The sub-band determiner, on connection of a new link, causes the frequency domain symbol generator 17 and/or optical signal generator 18 to temporarily operate in a training mode for determining the number of sub-bands to be used during the transmission of data. In this mode, optical training signals are transmitted, carrying predetermined data that is known at the receiver. Each training signal has a different number of sub-bands. At the receiving end of the optical link, each training signal is detected, and the bit-error rate of each detected optical test signal is determined. The bit-error rate information for each respective training signal is then transmitted back to transmitter 10, e.g. via a separate channel, and communicated to the sub-band determiner 22. The sub-band determiner 22 selects the number of sub-bands belonging to the signal with the lowest bit-error rate, and configures the frequency domain symbol generator 17 to use the selected quantity of sub-bands. Training may be repeated during operation of the system 24, for example if a degradation in received bit-error rate is detected, or if there is a change to the link properties or configuration.

Figure 3:
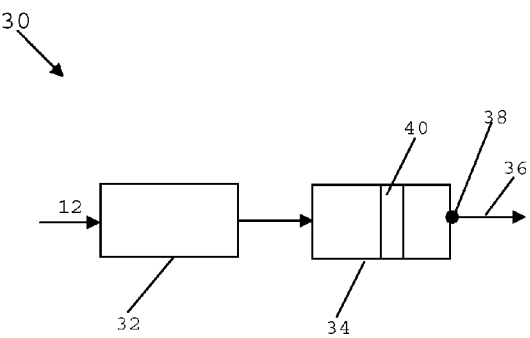
FIG. 3 is a block diagram of an optical receiver according to an embodiment of the invention.

FIG. 3 shows a block diagram of an optical receiver 30 configured to receive optical signal 12. The optical receiver 30 may be used as the receiver in the system 24 shown in FIG. 2. The receiver 30 comprises a detector 32 and a processor 34 in communication with the detector 32 and configured to process the detected signal and recover the transmitted data. The recovered data is converted to a series of digital bits 36 which are output at one or more electrical output ports 38.

The processor 34 includes an inverse PAPR reduction unit 40 that applies an inverse algorithm to the detected signal, undoing the algorithm performed in the transmitter 10. In the present embodiment, the inverse algorithm is an inverse discrete Fourier transform spreading (IDFT-s) algorithm. However, in alternative embodiments it may be an inverse selective mapping algorithm, or an inverse active constellation extension algorithm, etc. Generally, the inverse algorithm corresponds with the algorithm used in the transmitter.

In the presently disclosed embodiment, the transmitted signal 12 is an optical orthogonal frequency division multiplexed (O-OFDM) signal, which provides the following characteristics: (i) OFDM frames are used to fill a single-carrier-like spectrum within each sub-band, and (ii) OFDM helps maintain the orthogonality between the neighboring bands, and subsequently avoids inter-band crosstalk.

For ultrahigh speed systems such as 100 Gb/s and beyond, fiber dispersion plays a critical role, inducing fast walk-off between subcarriers. The PAPR of such signal is transient during transmission due to fiber link dispersion, thereby rendering the PAPR reduction at the transmitter ineffective. In contrast, the present inventor has discovered that if the PAPR mitigation approach is performed on a sub-band basis, each sub-band has a much narrower bandwidth, and the signal within each sub-band can be relatively undistorted over comparatively long distances. This results in less inter-band and intra-band nonlinearity. That is, PAPR reduction on a sub-band basis is more effective than on an entire OFDM spectrum basis.

The inventor has further demonstrated that there is an optimum sub-band bandwidth within which the PAPR mitigation should be performed. On one hand, if the sub-band bandwidth is too broad, the PAPR reduction will not be effective due to the fiber dispersion. On the other hand, if the sub-bands are too narrow, the neighbouring bands interact just as narrowly-spaced OFDM subcarriers, generating large inter-band crosstalk due to narrow sub-band spacing and incurring a large penalty.

One source of inter-band crosstalk is four-wave mixing (FWM). Due to the third-order fiber nonlinearity, the interaction of subcarriers at the frequencies of $f_i$, $f_j$, and $f_k$ produces a mixing product at the frequency of $f_g=f_i+f_j-f_k$. The magnitude of the FWM product for $N_s$ spans of the fiber link is given by $$P_g = \frac{D_x^2}{9}(\gamma L_{eff})^2 P_i P_j P_k e^{-\alpha L} \eta \tag{1}$$

where $D_x$ is the degeneration factor which equals 6 for non-degenerate FWM, and 3 for degenerate FWM. $P_{i,j,k}$ is the input power at the frequency of $f_{i,j,k}$, $\alpha$ and $L$ are respectively the loss coefficient and length of the fiber per span, $\gamma$ is the third-order nonlinearity coefficient of the fiber, $L_{eff}$ is the effective fiber length given by $$L_{eff} = \frac{1}{\alpha}(1 - e^{-\alpha L}) \tag{2}$$

and $\eta$ is the FWM coefficient which has a strong dependence on the relative frequency spacing between the FWM components given by $$\eta = \eta_1 \eta_2 \tag{3}$$

$$\eta_1 = \frac{\alpha^2}{\alpha^2 + \Delta\beta^2}\left\{1 + \frac{4\exp(-\alpha L)\sin^2(\Delta\beta L/2)}{[1-\exp(-\alpha L)]^2}\right\} \tag{4}$$

$$\eta_2 = \frac{\sin^2\{N_s\Delta\tilde{\beta}/2\}}{\sin^2\Delta\tilde{\beta}/2}, \Delta\tilde{\beta} = \Delta\beta L + \Delta\beta_1 L_1 \tag{5}$$

In (3) the overall FWM efficiency is decomposed into two separate contributions: (i) $\eta_1$, the FWM efficiency coefficient for single span (for simplicity, the contribution from dispersion compensation fiber is omitted), and (ii) $\eta_2$, the interference effect between $N_s$ spans of FWM products, also known as phase array effect. $\Delta\beta \equiv \beta_i+\beta_j-\beta_k-\beta_g$ is the phase mismatch in the transmission fiber. To obtain approximate estimation of optimal sub-band bandwidth, we assume that $f_i$ and $f_j$ are the two subcarriers within the same band and are set to the same value for simplicity, and $f_k$ is the subcarrier in a different band. The phase mismatch terms $\Delta\beta$ and $\Delta\tilde{\beta}$ in (4) and (5) can be rewritten as $$\Delta\beta = \frac{2\pi\lambda^2}{c}\Delta f^2 D, \Delta f = |f_i - f_k| \tag{6}$$

$$\Delta\tilde{\beta} = \frac{2\pi\lambda^2}{c}\Delta f^2 D_r, D_r = DL + D_1 L_1 = DL(1-\rho) \tag{7}$$

where the subscript '1' identifies parameters associated with the dispersion compensation fiber (DCF), D (or $D_1$) is the chromatic dispersion of the transmission fiber (or DCF), $\rho$ is the dispersion compensation ratio, $D_r$ is the residual chromatic dispersion per span accounting for both transmission fiber and DCF. Using a baseline system of 10×100 km link for analysis, the 3-dB bandwidth of FWM efficiency, $\Delta f_{3\ dB}$, is defined as the frequency spacing $\Delta f$ at which the FWM efficiency $\eta_1$ or $\eta_2$ drops to half of its maximum value. From (4), the 3-dB bandwidth for $\eta_1$, $\Delta f_{3\ dB}^1$ is (ignoring the contributing from the second term in (4))

$$\Delta f_{3\,dB}^1 = \sqrt{\frac{\alpha_C}{2\pi D\lambda^2}} \quad (8)$$

Similarly, from (5), the 3-dB bandwidth for $\eta_2$, $\Delta f_{3\ dB}^2$ is $$\Delta f_{3\,dB}^2 = \sqrt{\frac{1.4c}{\pi\lambda^2 D_a}}, D_a = N_s DL(1-\rho) \quad (9)$$

Figure 4:
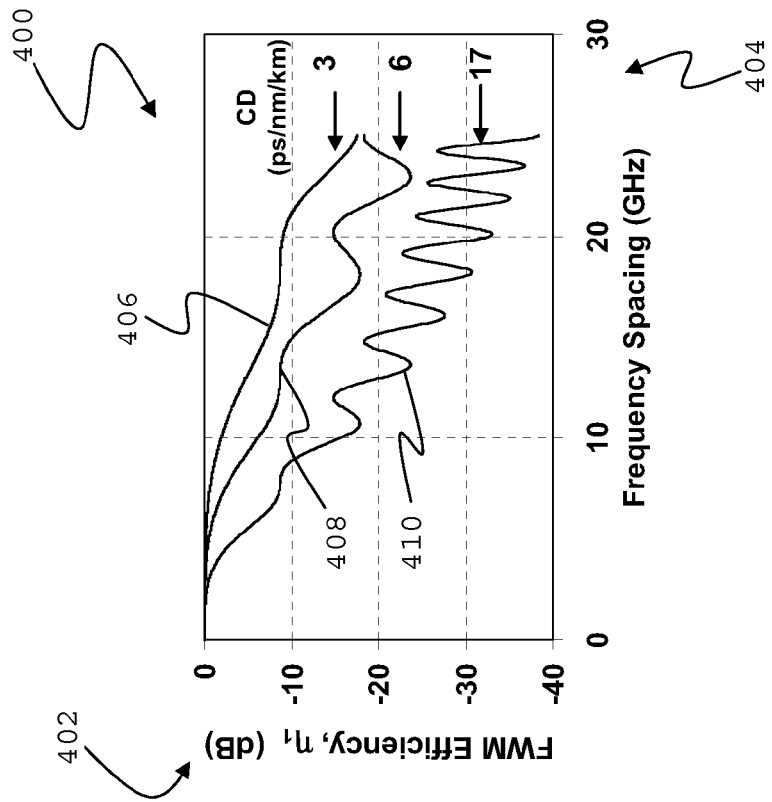
FIG. 4 is a diagram showing four-wave mixing efficiency coefficient $\eta_1$ due to one span of a transmission fiber.

FIG. 4 is a graph 400 showing the FWM efficiency coefficient per span 402 as a function of frequency spacing 404, with varying fiber chromatic dispersion (CD) of 3 ps/nm/km 406, 6 ps/nm/km 408 and 9 ps/nm/km 410. The fiber loss coefficient is 0.2 dB/km, and 10×100 km transmission link is assumed. It can be seen that the 3-dB bandwidths of $\eta_1$ are respectively about 11, 8, 4.8 GHz for CDs of 3, 6 and 17 ps/nm/km, which agrees with the analytical expression of (8).

Figure 5:
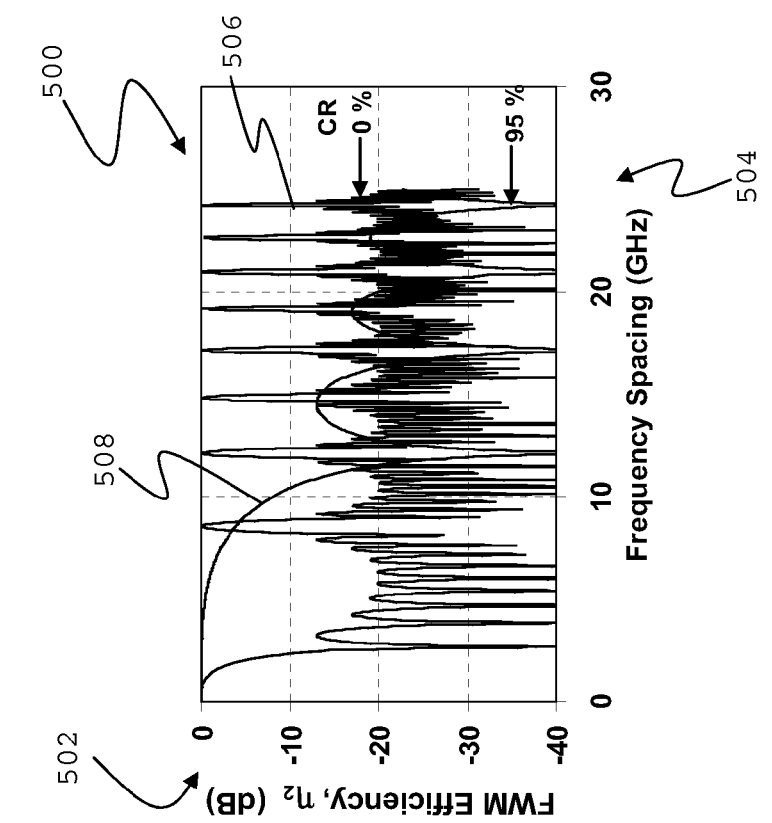
FIG. 5 is a diagram showing $\eta_2$ due to phase array effect.

FIG. 5 shows a graph 500 of the FWM coefficient 502 as a function of frequency spacing fir dispersion compensation ratios (CR) of 0% 506 and 95% 908, and for a transmission fiber with CD of 17 ps/nm/km. For un-compensated systems (CR=0%), the FWM 3-dB bandwidth is 1.8 GHz whereas for 95% CD compensated systems, the 3-dB bandwidth increases to 8 GHz, which agrees with the analytical expression of (9).

Optimal sub-band bandwidth is achieved by maintaining the FWM efficiency $\eta$ close to its maximum value within each sub-band while minimizing the intra-band FWM efficiency $\eta$. Therefore, the 3-dB bandwidth of FWM efficiency is a useful estimate of optimal sub-band bandwidth. FIGS. 4 and 5 thus enable an approximate estimate of the optimal sub-band bandwidth to be determined.

It follows from (9) that 3-dB bandwidth increases with CD compensation, and therefore the optimal sub-band bandwidth of CD-uncompensated systems is narrower than CD-compensated systems. One way of determining numerical value of the optimal sub-band bandwidth is by simulation, on a computational unit or device. Another is by on-line training during system/link initialisation.

There are various ways to perform PAPR reduction such as selective mapping and active constellation extension. The present embodiment employs DFT-S OFDM due to its relatively low computational complexity and compatibility with the OFDM frame structure.

Figure 6:
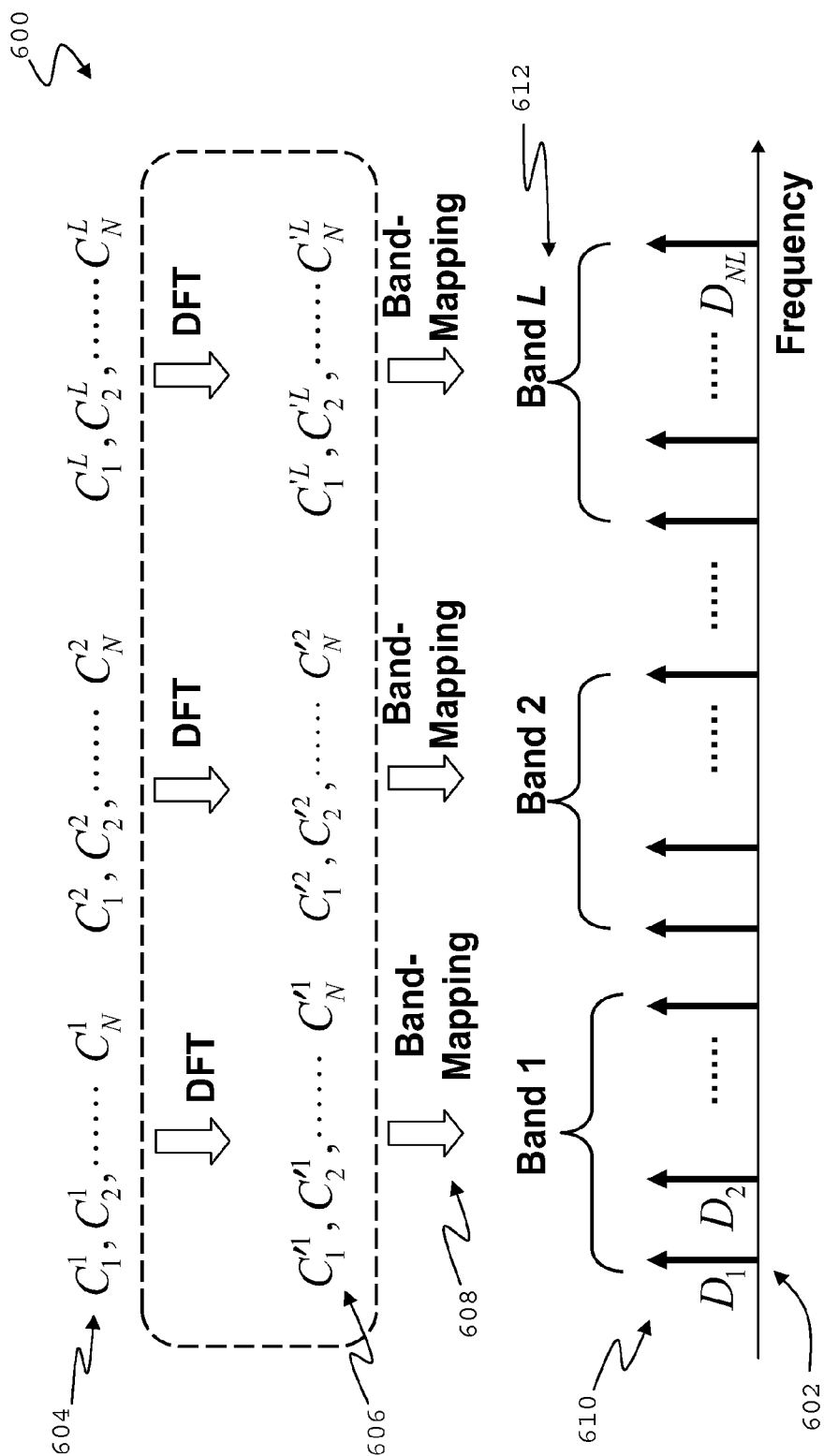
FIG. 6 shows a conceptual diagram of multiband DFT-spread OFDM embodying the invention.

FIG. 6 shows a conceptual diagram 600 of subcarrier mapping of multi-band Descrete Fourier Transform spread OFDM (MB-DFT-S-OFDM). It is instructive to compare the generation of MB-DFT-S-OFDM with conventional OFDM. For simplicity, the transform and mapping for one sub-band 602 is considered. The time-domain sample of conventional OFDM is given by $$x_m = \sum_{k=1}^{N} C_k e^{j\frac{2\pi}{N}(k-1)(m-1)} \quad (10)$$

where $x_m$ is the mth time-domain sample, $C_k$ is the kth frequency-domain symbol, N is the number of DFT points. For DFT-S systems, instead of directly applying the Inverse Discrete Fourier Transform (IDFT) to convert the frequency-domain symbol $C_k$ to time-domain symbol $x_m$, the original N symbols first go through DFT spreading, namely, a new set of N symbols 604 of $C_k'$ 606 are generated according to $$C_k' = \sum_{l=1}^{N} C_l e^{-j\frac{2\pi}{N}(k-1)(l-1)} \quad (11)$$

The new N symbols of $C_k'$ are then mapped 606 onto M-point DFT symbol vector D 610, for instance, from the $(K_1+1)$th to $(K_1+N)$th position, where $K_1$ is the starting position of band mapping. The time-domain DFT-S-OFDM signal for this sub-band signal is thus expressed as $$s_m = \sum_{k=K_1+1}^{K_1+N} D_k e^{j\frac{2\pi}{M}(k-1)(m-1)}, D_k = C_{k-K_1}' \quad (12)$$

where M=L·N and L is the number of sub-bands.

The effectiveness of the PAPR reduction of DFT-S-OFDM can be better appreciated by considering the special case of M=N, $K_1$=0 in (12). In this case, the time-domain signal $S_m$ is equal to OFDM symbol $C_k$ (essentially, single-carrier modulation). Subsequently, it is expected that the PAPR of DFT-S-OFDM will be significantly improved over conventional OFDM. For instance, the PAPR value that is exceeded with probability less than 0.1%, or 99.9-percentile PAPR, is 7.5 dB for DFT-S-OFDM which is 3.2 dB lower than 10.7 dB for conventional OFDM. In the proposed multiband DFT-S-OFDM, after DFT spreading, the new DFT-S symbols from all the bands will be mapped to L groups 612 of consecutive subcarriers, and the summation in (12) will extend from 1 to M. The receiver process is the reverse of (11) and (12). The summation in (12) is equivalent to the combining of multiple sub bands, which can be performed any one of, or a combination of, optical, electrical, and digital domains.

Figure 7:
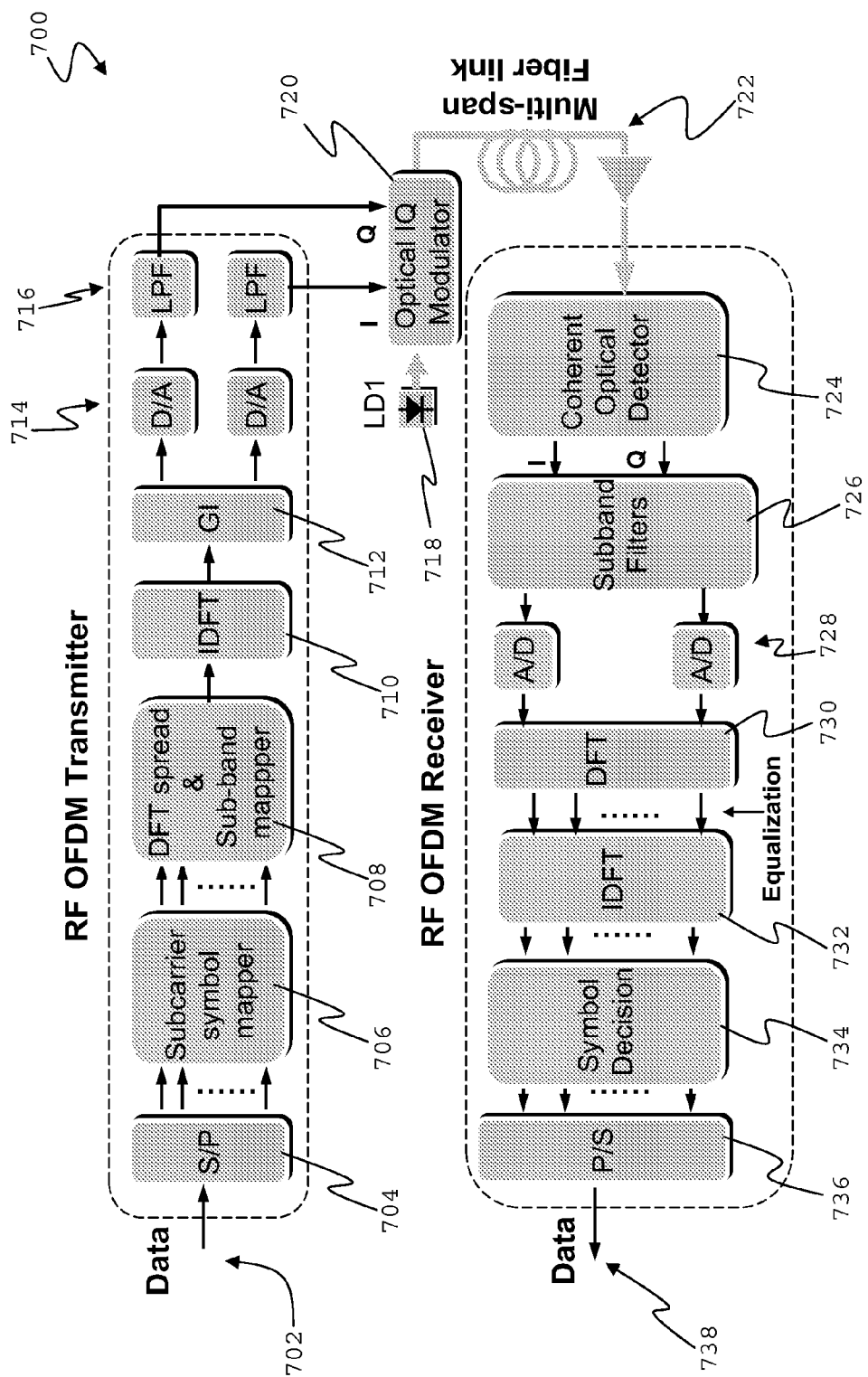
FIG. 7 is a block diagram of a coherent optical multiband DFT-S-OFDM system embodying the invention.

Simulations were performed to assess the nonlinearity-mitigation capability of multiband DFT-S-OFDM transmission. A block diagram 700 of the simulated system is shown in FIG. 7. An actual system employing multiband DFI-S-LOFDM may have the same components, although real rather than simulated, as the simulated system in FIG. 7. Dual-polarization transmission is used in the simulation, (and also may be used in a real system) but not shown in FIG. 7.

Serial data for transmission 702 is received into serial-to-parallel (S/P) converter 704. A subcarrier symbol mapper 706 computes corresponding frequency domain symbols which are input to DFT-spread and sub-band mapper 708. An inverse discrete Fourier transform (IDFT) unit 710, which may be implemented using a fast Fourier transform (FFT) algorithm generates a time-domain signal, into which guard intervals are inserted by guard-time inserter 712. In-phase and quadrature components of the resulting digital signal are converted to corresponding analog signal waveforms via digital-to-analog converters (ADCs) 714, and filtered to remove unwanted high-frequency components by low pass filters (LPFs) 716.

An optical source, e.g. laser diode 718, is modulated to create the optical signal 12 using an I-Q optical modulator 720, the inputs of which are driven by the analog in-phase and quadrature components of the generated signal.

The signal is transmitted through a multi-span optical fiber link 722, which comprised spans of single-mode transmission fiber, optical amplifiers (e.g. erbium doped fiber amplifiers) to compensate for span losses, and, optionally, sections of DCF to compensate for dispersion in the transmission spans.

At the receiving end of the link 722, a receiver comprises a coherent optical detector 724, which may include an optical local oscillator, and optical hybrid, and associated balanced detectors for recovering the in-phase and quadrature signal components, which are filtered via subband filters 726, and converted to sequences of sampled digital signal values by analog-to-digital converters (ADCs) 728. The digital signal are input to DFT unit 730, and IDFT unit 732, which reverse the PAPR reduction (DFT-spreading) algorithm, perform equalisation, and output recovered symbol values to symbol decision block 734. The decision block 736 recovers the data encoded in the symbols, which is input to parallel-to-serial (P/S) converter 736, and output in serial form 738.

In various embodiments, the IDFT 710 at the transmitter may be performed with a mixture of digital, electrical and optical combiners for ultra-high speed signal beyond the bandwidth of a CMOS platform. The subband filters 726 at the receiver may be implemented using digital, electrical, or optical filters.

For the results discussed below with reference to FIGS. 8 to 11, the simulated transmission parameters are: fiber length of 100 km per span, $D_{SSMF}$=16 ps/nm/km, $\alpha_{SSMF}$=0.2 dB/km, $\gamma_{SSMF}$=1.3 w$^{-1}$ km$^{-1}$, noise figure of optical amplifiers of 6 dB, eight WDM channels with 50-GHz channel spacing, 64 subcarriers in each sub-band when the number of sub-bands is over 8, and QPSK modulation on each subcarrier. For fair comparison, a 1/16th cyclic prefix ratio was used for all cases. This requires the number of subcarriers per sub-band to scale up in order to increase the absolute length of cyclic prefix when the number of sub-bands decreases below 8.

Figure 8:
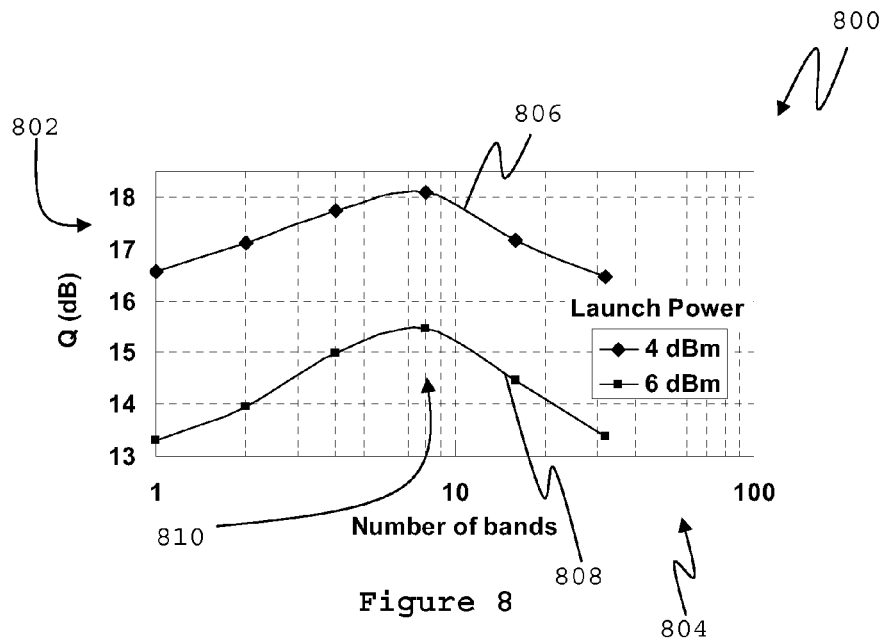
FIG. 8 shows Q factor as a function of number of bands at 4- and 6-dBm launch powers according to embodiments of the invention.

Firstly, the optimal number of sub-bands, or equivalently, the optimal sub-band bandwidth for 107-Gb/s multiband CO-OFDM signal is found. FIG. 8 shows a graph 800 of Q 802 as a function of the number of bands (on log-scale 804) at input powers of 4 dBm 806 and 6 dBm 808 for single-wavelength 107-Gb/s multi-band DFT-S-OFDM transmission. It can be seen that the optimal number of bands is close to 8 (810), corresponding to 3.6 GHz sub-band bandwidth. Accordingly, 8 bands are used in the following simulations, unless otherwise specified. It is noted that the number of subcarriers in each sub-band is not an important factor in nonlinearity performance for multiband DFT-S-OFDM systems, since the subcarriers in each sub-band are merely used to contain the same 'single-carrier' spectrum.

Simulations have been carried out to compare the performance between three systems: (i) multiband (8-band) DFT-S-OFDM, abbreviated as 'MB-DFT-S-OFDM', (ii) a single-carrier coherent system, abbreviated as 'SC', which is a special case of one-band DFT-S OFDM (its performance should be completely identical to the single-carrier coherent systems generated directly in time-domain with a Nyquist bandwidth) and (iii) 8-band conventional OFDM, abbreviated as 'MB-C-OFDM', where there is no DFT-spreading performed. For fair comparison, all three systems occupy the same bandwidth of 28.8 GHz, and use the same cyclic prefix ratio of 1/16. The cyclic prefix is preferable even for SC systems due to the large dispersion in ultrahigh speed systems to realize so-called single-carrier frequency-domain equalization (SC-FDE). In particular, due to the relatively large bandwidth, the absolute length of the cyclic prefix required for SC may be relatively long, implying long block lengths. But this is not a problem because the single-carrier is robust against a laser linewidth of 100 kHz.

Figures 9, 10:
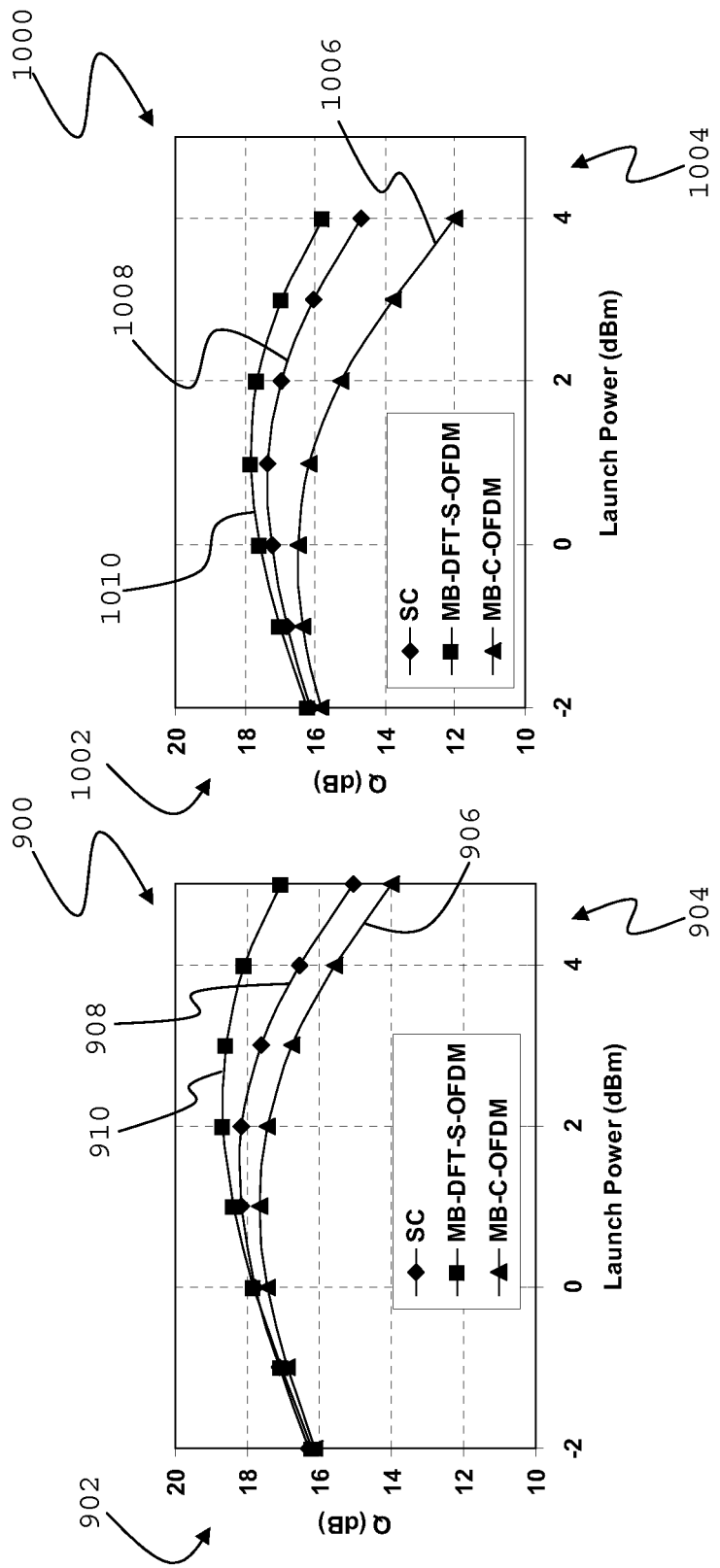
FIGS. 9 and 10 show Q factor comparisons between an embodiment of the invention and prior art systems, as a function of fiber launch power for single channel and 8-channel WDM transmission respectively.

FIGS. 9 and 10 show graphs 900, 1000 of Q factor 902, 1002 as a function of the launch power 904, 1004 for MB-DFT-S-OFDM 910, 1010, SC 908, 1008, and MB-C-OFDM 906, 1006 systems, respectively. The graph 900 shows results for a single-channel system, while the graph 1000 is for an 8-channel wavelength division multiplexed (WDM) transmission. For single channel (or WDM), the optimal Q factors for MB-OFT-S-OFDM are improved by 0.6 (or 0.5), and 1.0 (or 1.3) dB over SC and MB-C-OFDM systems, respectively.

Figure 11:
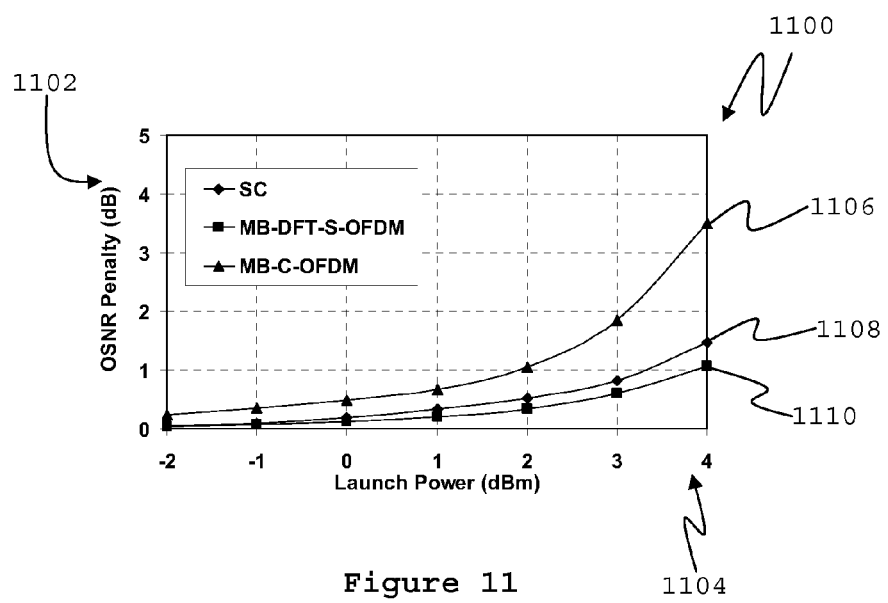
FIG. 11 shows Q penalty comparisons between an embodiment of the invention and prior art systems, due to fiber nonlinearity as a function of fiber launch power for 8-channel WDM transmission at a BER of $10^{-3}$.

An alternative method of assessing the nonlinear performance is to study the OSNR penalty 1102 against the launch power 1104, the result of which is shown in the graph 1100 of FIG. 11. The OSNR penalty 1102 is evaluated at the BER of 10$^{-3}$. The nonlinear threshold (NLT) is defined as the launch power that incurs OSNR penalty of 1 dB. The NLTs for SC 1108, MB-DFT-S-OFDM 1110, and MB-C-OFDM 1106 are respectively 3.3, 3.9, and 2 dBm, showing that MB-DFT-S-OFDM has 0.6 and 1.9 dB NLT improvement over SC and MB-C-OFDM. The primary focus here is on the nonlinearity performance comparison between CO-OFDM and SC.

For simulated 1000-km SSMF transmission, 8×107-Gb/s WDM MB-DFT-S-OFDM outperforms conventional CO-OFDM and coherent single-carrier systems by 1.3 and 0.5 dB, respectively.

As will be appreciated from the foregoing description, the invention may also be embodied in methods for transmission and reception of optical signals. For example, FIG. 12 is a flow chart 1200 representing a method of generating and transmitting an optical signal, as embodied, for example, in the transmitter 10. At step 1202 digital data is received. At step 1204, a plurality of frequency domain signals is generated from the input data, and each symbol is assigned to a sub-band. At step 1206 an algorithm resulting in reduction in PAPR, such as a DFT-spreading algorithm, is separately applied to each sub-band. At step 1208, an optical signal is generated for transmission.

The flow chart 1300 of FIG. 13 represents the data recovery method at the receiver. At step 1302, the optical signal generated by the process 1200 is detected. At step 1304 the detected signal is processed to reverse the PAPR reduction algorithm, apply equalisation, and demap the frequency domain symbols in order to recover the transmitted data.

Now that various embodiments have been described, it will be appreciated that embodiments of the invention may have some of the following advantages:
- reduced nonlinear distortion of the optical signal is realised.
- CO-OFDM may have a nonlinearity advantage over coherent single-carrier (SC), particularly for ultra-high speed transmission at 100 Gb/s and beyond.
- the Q factor of a signal generated according to the invention outperforms conventional OFDM and coherent single-carrier, in one simulation by 1.3 and 0.5 dB respectively for 1000-km SMMF fiber transmission, without optical dispersion compensation.

- the single-carrier in each sub-band via DFT spreading is spectrally tightly bounded within each band, compared with strongly overlapping in non-guard interval OFDM, and so demultiplexing of each sub-band is relatively easy with less oversampling.
- sub-band or subcarrier level signal processing, such as for nonlinearity mitigation, is possible which can not be easily achieved with a single-carrier modulation format.
- the spread subcarriers are not mapped distributively across the entire OFDM spectrum, and so dispersion does not rapidly alter the PAPR during transmission, maintaining a PAPR advantage during transmission over the fiber.
- the algorithm, particularly DFT spreading, is relatively low in complexity, and may be faster and easier to implement.

It will be understood to persons skilled in the art of the invention that many modifications may be made without departing from the spirit and scope of the invention. For example, the methods, devices, and systems described herein may be modified according to the teachings of the applicant's co-pending U.S. patent applications Ser. Nos. 12/509371 and 12/684018, which are incorporated herein by way of reference.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of transmitting digital information via a total number of frequency subcarriers over a nonlinear and dispersive optical channel, the method comprising the steps of:
    predetermining a plural number of frequency sub-bands, wherein each sub-band comprises a selected two or more of the total number of frequency subcarriers, and the plural number of frequency sub-bands is predetermined so as to reduce nonlinear optical distortion of an optical signal within the nonlinear and dispersive optical channel relative to a corresponding single frequency band signal having the same total number of frequency subcarriers, comprising:
    transmitting a plurality of training signals via the nonlinear and dispersive optical channel, each training signal comprising a predetermined data value and having a different number of sub-bands,
    detecting each training signal after transmission via the nonlinear and dispersive optical channel,
    processing each detected signal to recover received data,
    determining a bit-error rate of each detected training signal by comparing received data values with the predetermined data values of the training signal, and
    determining the predetermined plural number of sub-bands using the determined bit-error rates;
    receiving data comprising at least a portion of the digital information;
    generating from the data a plurality of frequency domain symbols;
    assigning each symbol to one of the predetermined plural number of frequency sub-bands;
    generating an optical signal comprising the total number of frequency subcarriers having a uniform frequency spacing, wherein the plural number of sub-bands are combined adjacently in the frequency domain; and
    transmitting the optical signal via said nonlinear and dispersive optical channel.

2. A method according to claim 1 comprising the further step of processing the frequency domain symbols to reduce a peak-to-average power ratio (PAPR) of the transmitted optical signal.

3. A method according to claim 2 wherein processing the frequency domain signals comprises applying a PAPR reduction algorithm to each frequency sub-band separately.

4. A method according to claim 3 wherein the PAPR reduction algorithm is selected from: a discrete Fourier transform spreading (DFT-s) algorithm, a selective mapping algorithm, and an active constellation extension algorithm.

5. A method according to claim 1 wherein predetermining the plural number of the sub-bands comprises computing the number of sub-bands.

6. A method according to claim 1 wherein the optical signal is an optical orthogonal frequency division multiplexed (O-OFDM) signal.

7. A receiving method of receiving digital information transmitted by a method according to claim 1, the receiving method comprising the steps of:
    detecting the optical signal comprising the predetermined plural number of frequency sub-bands;
    processing the detected optical signal to recover the frequency domain symbols assigned to each one of said predetermined plural number of frequency sub-bands; and
    processing the frequency domain symbols to recover received data.

8. A method according to claim 7 wherein the frequency domain symbols have been processed prior to transmission via the nonlinear and dispersive optical channel using an algorithm adapted to reduce a peak-to-average power ratio (PAPR) of the transmitted optical signal, and wherein the step of processing the frequency domain symbols to recover received data comprises applying an inverse algorithm adapted to reverse the effect of the algorithm adapted to reduce the PAPR of the transmitted optical signal.

9. A method according to claim 8 wherein the inverse algorithm is selected from: an inverse discrete Fourier transform spreading (IDFT-s) algorithm, an inverse selective mapping algorithm, and an inverse active constellation extension algorithm.

10. A method according to claim 7 wherein the optical signal is an optical orthogonal frequency division multiplexed (O-OFDM) signal.

11. An apparatus for transmitting digital information via a total number of frequency subcarriers over a nonlinear and dispersive optical channel, the apparatus being provided in use with input data comprising at least a portion of the digital information, the apparatus comprising:
    a sub-band determiner configured to predetermine a plural number of frequency sub-bands, wherein each sub-band comprises a selected two or more of the total number of frequency subcarriers, and the plural number of frequency sub-bands is predetermined so as to reduce nonlinear optical distortion of an optical signal within the nonlinear and dispersive optical channel relative to a corresponding single frequency band signal having the same total number of frequency subcarriers, wherein predetermining the plural number of the sub-bands comprises:
    transmitting a plurality of training signals via the nonlinear and dispersive optical channel, each training signal comprising a predetermined data value and having a different number of sub-bands,
detecting each training signal after transmission via the nonlinear and dispersive optical channel,
processing each detected signal to recover received data,
determining a bit-error rate of each detected training signal by comparing received data values with the predetermined data values of the training signal, and
determining the predetermined plural number of sub-bands using the determined bit-error rates;
a frequency domain symbol generator configured to generate from the input data a plurality of frequency domain symbols, and to assign each symbol to one of the predetermined plural number of frequency sub-bands;
a time-domain signal generator operatively coupled to the frequency domain symbol generator, and configured to generate a time-varying signal comprising the total number of frequency subcarriers having a uniform frequency spacing, wherein the plural number of sub-bands are combined adjacently in the frequency domain; and
an optical source having at least one modulation input operatively coupled to the time-domain signal generator, and configured to modulate an optical carrier with the time-varying signal to generate a corresponding optical signal comprising the plural number of sub-bands.

12. An apparatus according to claim 11 further comprising a peak-to-average power ratio (PAPR) reducing unit operatively coupled to the frequency domain symbol generator, and configured to processing the frequency domain symbols to reduce a peak-to-average power ratio (PAPR) of the transmitted optical signal.

13. An apparatus according to claim 12 wherein the PAPR reducing unit is configured to apply a PAPR reduction algorithm to each frequency sub-band separately.

14. An apparatus according to claim 13 wherein the PAPR reduction algorithm is selected from: a discrete Fourier transform spreading (DFT-s) algorithm, a selective mapping algorithm, and an active constellation extension algorithm.

15. A receiving apparatus for receiving digital information transmitted by an apparatus according to claim 11, the receiving apparatus comprising:
a detector configured to detect the optical signal comprising the predetermined plural number of frequency sub-bands; and
a processor configured to process the detected optical signal to recover the frequency domain symbols assigned to each one of said predetermined plural number of frequency sub-bands, and to process the frequency domain symbols to recover received data.

16. An apparatus according to claim 15 wherein the frequency domain symbols have been processed prior to transmission via the nonlinear and dispersive optical channel using an algorithm adapted to reduce a peak-to-average power ratio (PAPR) of the transmitted optical signal, and wherein the processor is further configured to process the frequency domain symbols to recover received data by applying an inverse algorithm adapted to reverse the effect of the algorithm adapted to reduce the PAPR of the transmitted optical signal.

17. An apparatus according to claim 16 wherein the inverse algorithm is selected from: an inverse discrete Fourier transform spreading (IDFT-s) algorithm, an inverse selective mapping algorithm, and an inverse active constellation extension algorithm.

* * * * *